(12) United States Patent
Tanahashi et al.

(10) Patent No.: US 9,909,633 B2
(45) Date of Patent: *Mar. 6, 2018

(54) BRAKING FORCE GENERATION DEVICE OF VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,085

(22) Filed: Feb. 8, 2016

(65) Prior Publication Data

US 2016/0230824 A1    Aug. 11, 2016

(30) Foreign Application Priority Data

Feb. 10, 2015  (JP) .................................. 2015-024547

(51) Int. Cl.
*F16D 65/00*    (2006.01)
*F16D 55/225*    (2006.01)
(Continued)

(52) U.S. Cl.
CPC .......... *F16D 65/0068* (2013.01); *B60R 16/06* (2013.01); *F16D 51/20* (2013.01);
(Continued)

(58) Field of Classification Search
CPC ... B60R 16/06; F16D 65/0068; F16D 55/225; F16D 55/226; F16D 55/228; F16D 51/20; F16D 2055/0016
See application file for complete search history.

(56) References Cited

U.S. PATENT DOCUMENTS

| 3,255,771 A | 6/1966 | MacSpadden |
| 3,597,668 A * | 8/1971 | Yoshimine ............. F02M 27/00 123/538 |

(Continued)

FOREIGN PATENT DOCUMENTS

| CN | 101500686 A | 8/2009 |
| CN | 101801695 A | 8/2010 |

(Continued)

OTHER PUBLICATIONS

Specification filed Apr. 28, 2016 for U.S. Appl. No. 15/032,793.
(Continued)

*Primary Examiner* — Xuan Lan Nguyen
(74) *Attorney, Agent, or Firm* — Sughrue Mion, PLLC

(57) ABSTRACT

A braking force generation device of a vehicle includes a rotary member, a frictional member, a pressing device, and a self-discharge type static charge eliminator provided on a surface of a particular member. The self-discharge type static charge eliminator changes air around the self-discharge type static charge eliminator into negative air ions, according to the quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant.

4 Claims, 7 Drawing Sheets

(51) Int. Cl.
  *B60R 16/06* (2006.01)
  *F16D 51/20* (2006.01)
  *F16D 55/226* (2006.01)
  *F16D 55/228* (2006.01)
  *F16D 55/00* (2006.01)

(52) U.S. Cl.
  CPC ......... *F16D 55/225* (2013.01); *F16D 55/226* (2013.01); *F16D 55/228* (2013.01); *F16D 2055/0016* (2013.01)

(56) References Cited

U.S. PATENT DOCUMENTS

| | | | |
|---|---|---|---|
| 3,922,214 A | | 11/1975 | Van Cakenberghe |
| 4,610,284 A | | 9/1986 | Bartholomew |
| 4,795,935 A | | 1/1989 | Fujii et al. |
| 5,021,918 A | | 6/1991 | Maki |
| 5,095,400 A | * | 3/1992 | Saito .................. H05F 3/04 361/212 |
| 5,116,697 A | | 5/1992 | Fleischmann et al. |
| 5,212,451 A | | 5/1993 | Werner, Jr. |
| 5,271,473 A | | 12/1993 | Ikeda et al. |
| 5,382,359 A | * | 1/1995 | Brandt .................. B01D 27/08 210/243 |
| 5,510,658 A | | 4/1996 | Nakayama |
| 5,825,605 A | | 10/1998 | Sutherland |
| 5,996,684 A | | 12/1999 | Clifton et al. |
| 6,008,978 A | | 12/1999 | Tateyama |
| 6,168,713 B1 | | 1/2001 | Sekine et al. |
| 6,207,592 B1 | | 3/2001 | Nickell |
| 6,223,731 B1 | | 5/2001 | Yoshiume et al. |
| 6,235,385 B1 | * | 5/2001 | Lee .................. C09J 7/0296 428/343 |
| 6,589,420 B1 | | 7/2003 | Mathew |
| 6,653,646 B1 | | 11/2003 | Shibata |
| 7,151,988 B2 | | 12/2006 | Sasaki et al. |
| 7,248,454 B2 | * | 7/2007 | Takayanagi ............ H01T 23/00 361/212 |
| 7,612,352 B2 | | 11/2009 | Iizuka et al. |
| 7,684,169 B1 | * | 3/2010 | Larkin .................. H05F 3/02 361/231 |
| 7,832,528 B1 | * | 11/2010 | Liang .................. B60T 1/14 188/5 |
| 7,971,689 B2 | * | 7/2011 | Moore .................. F16D 65/18 188/106 P |
| 8,039,823 B2 | | 10/2011 | Iizuka et al. |
| 8,432,658 B1 | | 4/2013 | Heise |
| 8,503,154 B2 | * | 8/2013 | Nakai .................. B60R 16/06 361/216 |
| 8,681,470 B2 | | 3/2014 | Gorczyca et al. |
| 9,044,916 B2 | * | 6/2015 | Koike .................. B32B 7/06 |
| 2002/0000289 A1 | | 1/2002 | Nickell et al. |
| 2002/0179311 A1 | * | 12/2002 | Alper .................. B60R 16/06 174/5 SG |
| 2003/0131828 A1 | | 7/2003 | Crary |
| 2003/0183465 A1 | * | 10/2003 | Ikeda .................. F16D 65/58 188/325 |
| 2003/0202830 A1 | | 10/2003 | Oh et al. |
| 2004/0060720 A1 | | 4/2004 | Riach |
| 2004/0231730 A1 | | 11/2004 | Nakamura et al. |
| 2005/0174718 A1 | | 8/2005 | Fujita et al. |
| 2006/0213422 A1 | | 9/2006 | Zimmermann et al. |
| 2006/0277990 A1 | | 12/2006 | Saito et al. |
| 2007/0144462 A1 | | 6/2007 | Green |
| 2007/0227843 A1 | | 10/2007 | Park |
| 2008/0022766 A1 | | 1/2008 | Saito et al. |
| 2008/0036241 A1 | * | 2/2008 | Aisenbrey ............ B62D 29/00 296/187.01 |
| 2008/0099595 A1 | | 5/2008 | Lewis et al. |
| 2009/0256341 A1 | | 10/2009 | Okada et al. |
| 2010/0072777 A1 | | 3/2010 | Ramsay |
| 2010/0154643 A1 | | 6/2010 | Goto et al. |
| 2010/0200343 A1 | | 8/2010 | Kondo et al. |
| 2011/0139121 A1 | | 6/2011 | Hackenberg et al. |
| 2012/0039012 A1 | | 2/2012 | Nakai |
| 2012/0092805 A1 | | 4/2012 | Chen et al. |
| 2012/0181827 A1 | | 7/2012 | Aoki et al. |
| 2012/0235631 A1 | | 9/2012 | Nakashima et al. |
| 2012/0300522 A1 | | 11/2012 | Tokuyama |
| 2013/0183859 A1 | | 7/2013 | Chang |
| 2013/0291837 A1 | | 11/2013 | Johnson et al. |
| 2014/0120293 A1 | | 5/2014 | Gupta |
| 2014/0247554 A1 | | 9/2014 | Sharma et al. |
| 2014/0324289 A1 | | 10/2014 | Uchino et al. |
| 2016/0059838 A1 | | 3/2016 | Yamada et al. |
| 2016/0108868 A1 | | 4/2016 | Tanahashi et al. |
| 2016/0177811 A1 | | 6/2016 | Tanahashi et al. |
| 2016/0186639 A1 | | 6/2016 | Tanahashi et al. |
| 2016/0186703 A1 | | 6/2016 | Tanahashi et al. |
| 2016/0200270 A1 | | 7/2016 | Tanahashi et al. |
| 2016/0208748 A1 | | 7/2016 | Tanahashi et al. |
| 2016/0214453 A1 | | 7/2016 | Tanahashi et al. |
| 2016/0223024 A1 | | 8/2016 | Tanahashi et al. |
| 2016/0280162 A1 | | 9/2016 | Yamada et al. |

FOREIGN PATENT DOCUMENTS

| | | |
|---|---|---|
| CN | 202524630 U | 11/2012 |
| DE | 19508521 A1 | 9/1996 |
| DE | 20200069 U1 | 11/2002 |
| DE | 20200070 U1 | 11/2002 |
| DE | 102008001103 A1 | 10/2009 |
| DE | 102010003789 A1 | 10/2011 |
| EP | 1116621 A1 | 7/2001 |
| EP | 3009653 A1 | 4/2016 |
| GB | 824448 A | 12/1959 |
| GB | 1201722 A | 8/1970 |
| JP | 50-26778 A | 3/1975 |
| JP | 50-026778 U1 | 3/1975 |
| JP | 61-194999 A | 8/1986 |
| JP | 61-194999 U | 12/1986 |
| JP | 62-156395 A | 7/1987 |
| JP | 62-223390 A | 10/1987 |
| JP | 1-268160 A | 10/1989 |
| JP | 04-040800 U | 4/1992 |
| JP | 05-238438 A | 9/1993 |
| JP | 6-3396 A | 1/1994 |
| JP | 6-27372 U | 4/1994 |
| JP | 10-55895 A | 2/1998 |
| JP | 1083891 A | 3/1998 |
| JP | H10-213223 A | 8/1998 |
| JP | 11-030265 A | 2/1999 |
| JP | 2000-13280 A | 1/2000 |
| JP | 2000-19296 A | 1/2000 |
| JP | 2001-234469 A | 8/2001 |
| JP | 2001-355524 A | 12/2001 |
| JP | 2002-104106 A | 4/2002 |
| JP | 2003-226134 A | 8/2003 |
| JP | 2003-312277 A | 11/2003 |
| JP | 2004-11563 A | 1/2004 |
| JP | 2006-88880 A | 4/2006 |
| JP | 2008-143476 A | 6/2006 |
| JP | 2006-234093 A | 9/2006 |
| JP | 2007-225111 A | 9/2007 |
| JP | 2007-302202 A | 11/2007 |
| JP | 2008-24229 A | 2/2008 |
| JP | 2008-49938 A | 3/2008 |
| JP | 2008-181694 A | 8/2008 |
| JP | 2008-273224 A | 11/2008 |
| JP | 2009-24361 A | 2/2009 |
| JP | 2009-181694 A | 8/2009 |
| JP | 2009-191852 A | 8/2009 |
| JP | 2009-208882 A | 9/2009 |
| JP | 2010-177128 A | 8/2010 |
| JP | 2010-192177 A | 9/2010 |
| JP | 2010-236464 A | 10/2010 |
| JP | 2010-260391 A | 11/2010 |
| JP | 2011-47320 A | 3/2011 |
| JP | 2011-111091 A | 6/2011 |
| JP | 2012-24746 A | 2/2012 |
| JP | 2012-210945 A | 11/2012 |
| JP | 3191490 U | 6/2014 |
| JP | 2014-218244 A | 11/2014 |

(56) References Cited

FOREIGN PATENT DOCUMENTS

| JP | 3194675 U | 11/2014 |
|---|---|---|
| JP | 2016-49880 A | 4/2016 |
| JP | 2016-78640 A | 5/2016 |
| KR | 1998-015718 U | 6/1998 |
| WO | 8701301 A1 | 3/1987 |
| WO | 2015064195 A1 | 5/2015 |

OTHER PUBLICATIONS

Communication dated Mar. 24, 2017 from the United States Patent and Trademark Office in counterpart U.S. Appl. No. 14/993,575.
Office Action dated Sep. 23, 2016 issued by the U.S. Patent and Trademark Office in counterpart U.S. Appl. No. 14/993,575.
English Translation of communication drafted Jan. 31, 2017, from the Japanese Patent Office in counterpart application No. 2015-004288.
Notice of Allowance dated Jan. 19, 2017, which issued during the prosecution of U.S. Appl. No. 15/003,933.
An Office Action dated Jan. 19, 2017, which issued during the prosecution of U.S. Appl. No. 14/882,978.
Notice of Allowance dated May 10, 2017 which issued during the prosecution of U.S. Appl. No. 14/882,978.
Communication dated Jul. 21, 2017 issued by the U.S. Patent and Trademark Office in counterpart U.S. Appl. No. 14/945,764.
Communication dated Jun. 27, 2017 issued by the U.S. Patent & Trademark Office in counterpart U.S. Appl. No. 15/003,933.
Communication dated Jul. 19, 2017 issued by the Korean Intellectual Property Office in counterpart application No. 10-2016-0010987.
Office Action dated Apr. 20, 2017 issued by the U.S. Patent and Trademark Office in counterpart U.S. Appl. No. 14/972,184.
An Office Action dated Oct. 27, 2017, which issued during the prosecution of U.S. Appl. No. 14/972,184.
An Office Action dated Nov. 16, 2017, which issued during the prosecution of U.S. Appl. No. 14/993,575.
Communication dated Jan. 3, 2018 from the U.S. Patent and Trademark Office in U.S. Appl. No. 14/945,764.

* cited by examiner

BRAKING FORCE GENERATION DEVICE OF VEHICLE

CROSS-REFERENCE TO RELATED APPLICATIONS

This application claims priority from Japanese Patent Application No. 2015-024547 filed on Feb. 10, 2015, the disclosure, including the specification, drawings and abstract, of which is incorporated herein by reference in its entirety.

BACKGROUND

1. Field

The embodiments described below relate to a braking force generation device of a vehicle, and in particular to a braking force generation device that generates a braking force using frictional force generated between a rotary member and a friction member.

2. Description of Related Art

A braking force generation device of a vehicle has a rotary member (e.g., a brake disc) that rotates about a rotational axis along with a wheel, a friction member (e.g., a brake pad) that is supported so as not to rotate about the rotational axis, and a pressing device (e.g., a wheel cylinder). The pressing device includes (i) a stationary member, such as a caliper support member, supported by a knuckle, and (ii) a displacement member (e.g., a caliper and a piston) that slides relative to the stationary member and presses the friction member against the rotary member. Sliding portions of the stationary member and the displacement member are lubricated by a lubricant such as grease.

In the meantime, when a vehicle, such as an automobile, runs, static electricity is generated in the vehicle since air flows while being in friction contact with the vehicle. Also, static electricity is generated, due to each portion of the vehicle's tires having repeated contact with and separation from a road surface as the vehicle's wheels of the vehicle rotate. Further, static electricity is generated due to relative movements of constituent components of an engine and a brake system, for example.

The vehicle is substantially electrically insulated from the ground due to the presence of the tires having a low electric conductivity. Therefore, if static electricity is generated in the vehicle, the vehicle body, for example, is electrostatically charged (generally with positive charges). Since radio noise is likely to be generated if the vehicle body is charged, structures for reducing electric charges carried by the vehicle have been studied, and various structures have been proposed.

For example, one such device is a bearing device having an inner race member, an outer race member, and a plurality of rolling elements interposed between these race members as described in Japanese Patent Application Publication No. 2006-234093 (JP 2006-234093 A). This bearing device has seal devices which each include an elastic member that contacts with one of the race members. Also, the interior of the bearing device is filled with conductive grease.

SUMMARY

As described above, in a braking force generation device, grease also lubricates the sliding portions of the stationary member and the displacement member. This grease is supposed to be electrically charged. For example, according to the arrangement of the bearing device described in JP 2006-234093 A, using grease having an electric conductivity may be considered, as the grease that lubricates the sliding portions of the stationary member and the displacement member in the braking force generation device.

If the arrangement described in JP 2006-234093 A as identified above (i.e. using a grease having electric conductivity) is applied to the lubrication of the sliding portions of the stationary member and the displacement member, electric charges may be more easily transferred from the grease to the stationary member and the displacement member, as compared with the case where the grease has no conductivity. However, in a situation where the vehicle body, for example, is electrically charged, members surrounding the stationary member and the displacement member are also electrically charged, and the quantity of charge of these surrounding members is also large. Therefore, charges cannot be transferred from the stationary member and the displacement member to the surrounding members, and charges carried by the grease cannot be effectively reduced. In order to transfer charges from the stationary member and the displacement member to the surrounding members, it is necessary to remove or eliminate charges carried by the surrounding members by earthing, via a device, such as an electrostatic eliminator, as described in Japanese Patent Application Publication No. 2008-181694 (JP 2008-181694 A), for example.

Rather than transferring charges from the stationary member and the displacement member to the surrounding members by means of a special device, such as an electrostatic eliminator as discussed above, the inventor of this disclosure, discovered, through experimental research, that charges can be eliminated by releasing charges into the air by means of an air-ion-exchange type self-discharge static charge eliminator.

The embodiments described below provide a braking force generation device, based on the finding obtained by the inventor.

According to one embodiment, the braking force generation device for the vehicle includes a rotary member, a friction member, a pressing device, and a self-discharge type static charge eliminator. The rotary member rotates about a rotational axis along with a wheel. The friction member is supported so as not to rotate about the rotational axis. The pressing device includes a stationary member and a displacement member. The stationary member is supported by a knuckle. The displacement member is operable to slide relative to the stationary member, support the friction member and press the friction member against the rotary member. Sliding portions of the stationary member and the displacement member are lubricated by a lubricant. A self-discharge type static charge eliminator is provided on a surface of a particular member. The particular member is at least one of the rotary member, the friction member, the stationary member and the displacement member. The self-discharge type static charge eliminator is an air-ion-exchange type self-discharge static charge eliminator. The air-ion-exchange type self-discharge static charge eliminator is configured to change air around the self-discharge type static charge eliminator into negative air ions, according to a quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant.

The reason why a lubricant, such as grease, in the braking force generation device is electrically charged when the vehicle body, etc. are electrically charged, and the reason why the viscosity of the lubricant is increased when the oil is electrically charged are not altogether clear, but the main reasons may be as follows. The braking force generation device has a rotary member that rotates about the rotational axis along with the wheel, a friction member supported so as not to rotate about the rotational axis, and a pressing device. The pressing device includes a stationary member supported by a knuckle, and a displacement member that slides relative to the stationary member, supports the friction member, and presses the friction member against the rotary member.

Accordingly, if the vehicle body, etc. are electrically charged, electric charges move from the wheel to the rotary member via a wheel support member, and move from the knuckle to the stationary member. If the quantity of charge carried by the stationary member is increased, a part of the charges move to the lubricant and the displacement member, whereby the lubricant is electrically charged. If the lubricant is electrically charged, the freedom of molecules of the lubricant is reduced, presumably resulting in increase of the viscosity of the lubricant. If the quantity of charge carried by the rotary member and the displacement member is increased, a part of the charges move to the friction member, so that the friction member is also electrically charged.

According to the above embodiment, the self-discharge type static charge eliminator is provided on the surface of the particular member as at least one of the rotary member, friction member, stationary member, and the displacement member. The static charge eliminator changes the ambient air into negative air ions, and eliminates charge by causing the negative air ions to attract positive charges of the particular member for neutralization, so as to reduce the quantity of charge of the particular member. As a result, charges carried by the lubricant in the braking force generation device move to the particular member, so that the quantity of charge of the lubricant is reduced; therefore, the viscosity of the lubricant can be prevented from being increased due to excessive charging, and the viscosity resistance of the lubricant can be prevented from being increased.

According to the above embodiment, no electrostatic eliminator having a complicated structure is needed, and it is not necessary to connect an electrostatic eliminator to a negative terminal of a battery and the vehicle body via conducting wires. Also, the self-discharge type static charge eliminator may be a thin conductor, for example, which can perform so-called self-discharge by using charges carried by the particular member; therefore, large space is not needed as in the case where the electrostatic eliminator is installed. It is, however, to be noted that an electrostatic eliminator may be installed on a vehicle in which the braking force generation device as described herein is incorporated.

In the braking force generation device according to the above embodiment, the rotary member may be a brake disc that rotates about the rotational axis. The friction member may be a brake pad. The pressing device may be a floating type pressing device. The stationary member may be a caliper support member. The displacement member may include a caliper and a piston. The caliper may be operable to slide relative to the caliper support member along an axis parallel to the rotational axis. The piston may be operable to slide relative to the caliper and press the brake pad against the brake disc. The particular member may be at least one of the brake disc, the brake pad, the caliper support member and the caliper.

According to the arrangement as described above, the braking force generation device is that of a floating caliper disc brake type. The particular member is at least one of the brake disc, brake pad, caliper support member, and the caliper, and the self-discharge type static charge eliminator is provided on at least one of these members. Accordingly, it is possible to reduce the quantity of charge of the particular member through neutralization by the self-discharge type static charge eliminator, so that electric charges carried by the lubricant in the braking force generation device of the floating caliper type disc brake are transferred to the particular member; therefore, the quantity of charge of the lubricant can be reduced.

In the braking force generation device according to the above embodiment, the rotary member may be a brake disc that rotates about the rotational axis. The friction member may be a brake pad. The pressing device may be an opposed-piston type pressing device. The stationary member may be a caliper. The displacement member may include at least two pistons. The pistons may be disposed on opposite sides of the brake disc and may be operable to slide relative to the caliper along an axis parallel to the rotational axis. The pistons may be operable to press the brake pad against the brake disc. The particular member may be at least one of the brake disc, the brake pad and the caliper.

According to the arrangement as described above, the braking force generation device is that of an opposed-piston disc brake type. The particular member is at least one of the brake disc, brake pad, and the caliper, and the self-discharge type static charge eliminator is provided on at least one of these members. Accordingly, it is possible to reduce the quantity of charge of the particular member through neutralization by the self-discharge type static charge eliminator, so that electric charges carried by the lubricant in the braking force generation device of the opposed-piston caliper type disc brake are transferred to the particular member; therefore, the quantity of charge of the lubricant can be reduced.

In the braking force generation device according to the above embodiment, the rotary member may be a brake drum that rotates about the rotational axis. The friction member may be a brake shoe. The stationary member may be configured to support the brake shoe such that the brake shoe can be displaced relative to the stationary member, and fixedly support the pressing device. The particular member may be at least one of the brake drum, the brake shoe, and the stationary member.

According to the arrangement as described above, the braking force generation device is that of a drum brake type. The particular member is at least one of the brake drum, brake shoe, and the stationary member, and the self-discharge type static charge eliminator is provided on at least one of these members. Accordingly, it is possible to reduce the quantity of charge of the particular member through neutralization by the self-discharge type static charge eliminator, so that electric charges carried by the lubricant in the braking force generation device of the drum brake type are transferred to the particular member; therefore, the quantity of charge of the lubricant can be reduced.

In the braking force generation device according to the above embodiment, the self-discharge type static charge eliminator may include an electrically conductive metal foil having a multiplicity of minute protrusions and recesses at a side surface of an outer periphery, and a layer of an adhesive applied to one surface of the metal foil. The self-discharge type static charge eliminator may be fixed to the particular member by bonding using the layer of the adhesive.

According to the arrangement as described above, the metal foil that eliminates charge can be easily fixed by bonding to the surface of the particular member. Further, the metal foil adheres to the particular member via the layer of the adhesive that covers the entire area of the metal foil. Therefore, electric charges can be efficiently transferred from the particular member to the metal foil, and the effect of neutralization can be enhanced.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4A is a cross-sectional view, and FIG. 4B is a plan view;

DETAILED DESCRIPTION OF EMBODIMENTS

Referring to the accompanying drawings, preferred embodiments will be described in detail.

First Embodiment

Figure 1:
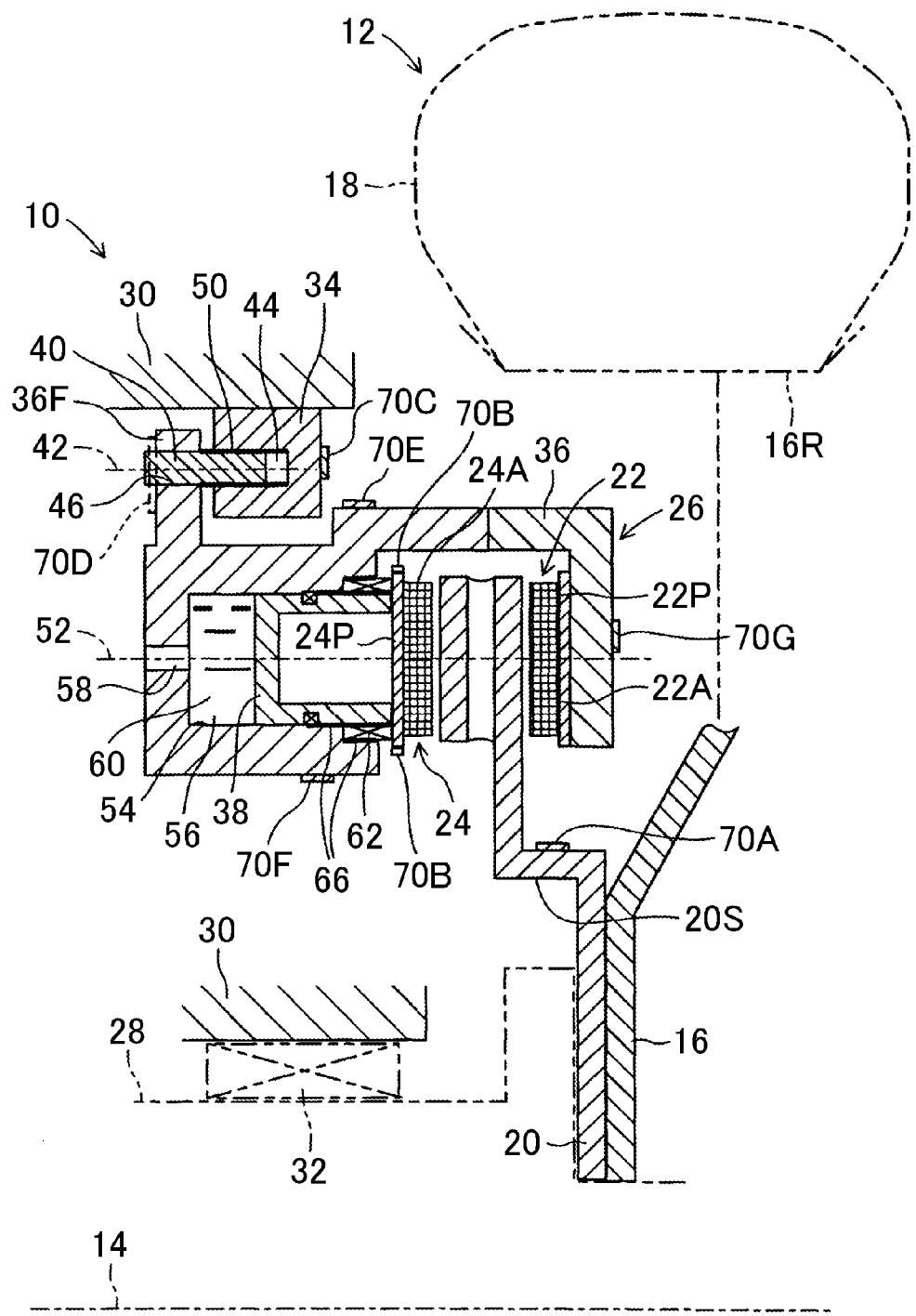
FIG. 1 is a cross-sectional view schematically showing a braking force generation device according to a first embodiment, which is used for a floating caliper type disc brake.
Figure 2:
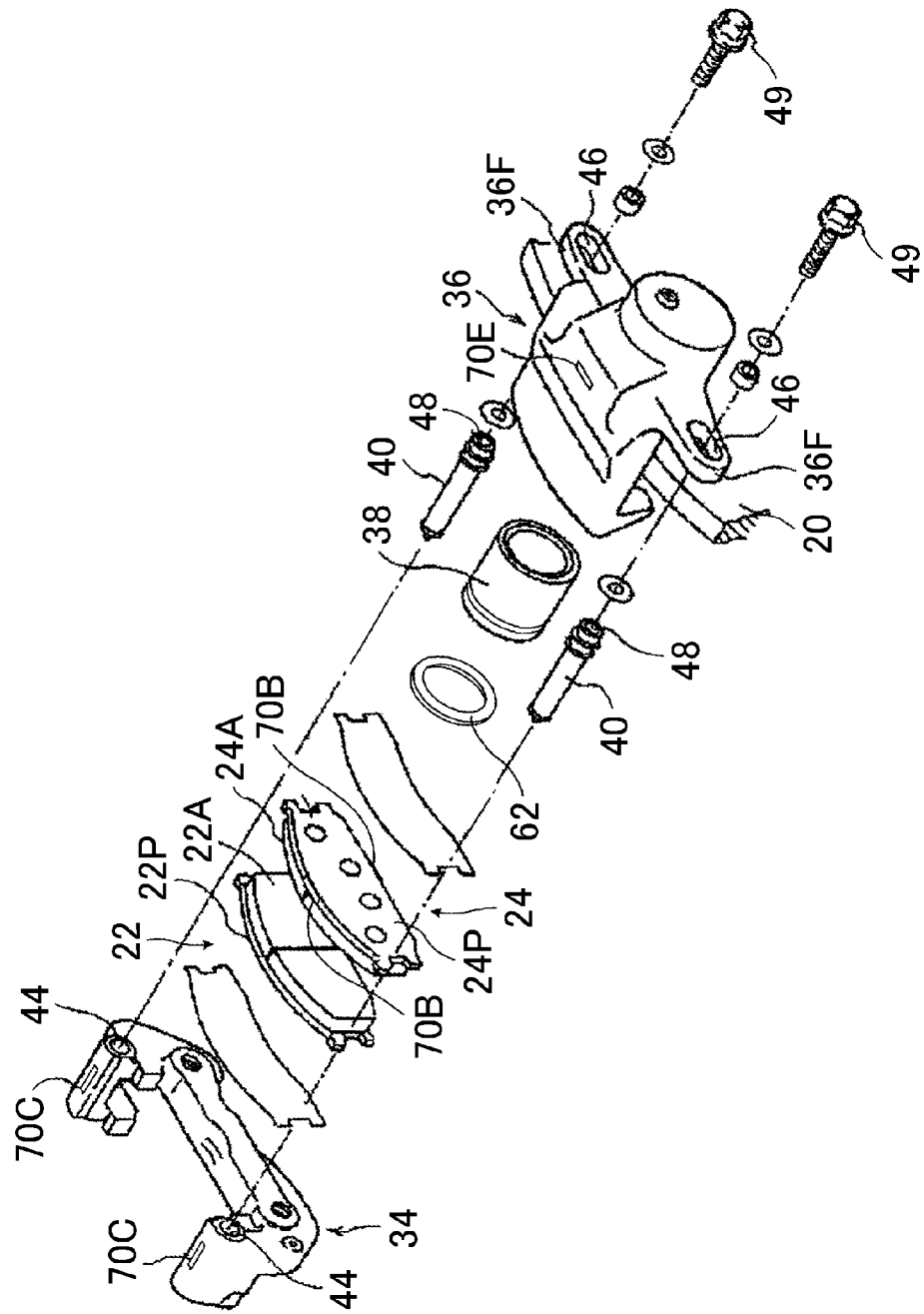
FIG. 2 is an exploded, perspective view showing a specific example of the braking force generation device shown in FIG. 1.

FIG. 1 is a cross-sectional view schematically showing a braking force generation device 10 according to a first embodiment, which is used for a floating caliper type disc brake. FIG. 2 is an exploded, perspective view showing a specific example of the braking force generation device 10 shown in FIG. 1.

In these figures, reference numeral 12 denotes a wheel that rotates about a rotational axis 14, and the wheel 12 includes a wheel member 16, and a tire 18 mounted on a rim portion 16R on an outer periphery of the wheel member 16. The braking force generation device 10 includes a brake disc 20 as a rotary member that rotates about the rotational axis 14 along with the wheel 12, brake pads 22 and 24 as friction members, and a pressing device 26 that presses the brake pads 22 and 24 against the brake disc 20.

The wheel member 16 and the brake disc 20 are integrally fixed at their radially inner portions to a flange portion of an axle hub 28 by bolts. The wheel 12 is a drive wheel, and the axle hub 28 is supported, via a bearing 32, by a knuckle 30 connected to a vehicle body via a suspension arm (not shown), such that the axle hub 28 is rotatable about the rotational axis 14. Further, the axle hub 28 is fitted on an axle (not shown) that extends along the rotational axis 14, such that the axle hub 28 rotates integrally with the axle about the rotational axis 14.

Members explained in this disclosure are formed of metal, such as steel, having electric conductivity, except for those members which constituent materials that are particularly mentioned. Further, portions of the metal members, other than the brake disc 20, which are exposed to the atmosphere are painted, and their surfaces are covered with non-conductive coating films, for increased durability.

The pressing device 26 is a floating-type pressing device, and includes a caliper support member (caliper base) 34, a caliper 36 that extends so as to straddle a radially outer portion of the brake disc 20, and a piston 38. The caliper support member 34 is connected to the knuckle 30, and functions as a stationary member that does not move relative to the knuckle 30. The caliper 36 supports inner end portions of a pair of slide pins 40 that are spaced apart from each other in a circumferential direction about the rotational axis 14, and the slide pins 40 extend along axes 42 parallel to the rotational axis 14. The slide pins 40 are inserted in slide pin holes 44 provided in the caliper support member 34 such that the slide pins 40 can slidably reciprocate along the axes 42.

In a non-limiting embodiment shown in FIG. 1, the caliper 36 is formed by integrally joining a main portion located on the inner side as viewed in the vehicle lateral direction relative to the brake disc 20, and an auxiliary portion located on the outer side in the vehicle lateral direction relative to the brake disc 20. However, the main portion and auxiliary portion of the caliper 36 may be formed as an integral body. This also applies to a caliper 36 of a second embodiment which will be described later.

As shown in FIG. 2, the inner end portions of the slide pins 40 are inserted in support holes 46 provided in flange portions 36F of the caliper 36. Further, fixing bolts 49 are screwed into bolt holes 48 provided in the inner end portions of the slide pins 40, from one side of the flange portions 36F opposite to the caliper support member 34, so that the inner end portions of the slide pins 40 are fixed to the flange portions 36F. As indicated by thick solid lines in FIG. 1, sliding portions of the slide pins 40 and slide pin holes 44, namely, cylindrical surfaces of the slide pins 40 and walls of the slide pin holes 44, are lubricated with grease 50 as a lubricant. Accordingly, the caliper 36 functions as a displacement member that can slide relative to the caliper support member 34 and the knuckle 30, along the axes 42 parallel to the rotational axis 14.

The caliper 36 has a cylinder hole 54 that extends along an axis 52 parallel to the rotational axis 14 and is open toward the outer side as viewed in the vehicle lateral direction. The piston 38 is inserted in the cylinder hole 54 such that the piston 38 can slidably reciprocate along axis 52, and cooperates with the cylinder hole 54 to form a wheel cylinder chamber 56. Accordingly, the piston 38 functions as another displacement member that can slide relative to the caliper 36 along the axis 52. In operation, high-pressure brake oil 60 is supplied from a brake actuator (not shown) via a port 58 to the wheel cylinder chamber 56, and is discharged via the port 58 from the wheel cylinder chamber 56.

The brake pads 22 and 24 have respective back plates 22P and 24P made of metal, and friction materials 22A and 24A formed of a friction material. The friction materials 22A and 24A are integrally fixed to the back plates 22P and 24P, respectively. The friction materials 22A and 24A are located on the sides of the back plates 22P, 24P closer to the brake disc 20, and are opposed to the brake disc 20. The brake pad 22 is attached to an inner surface of the caliper 36 on the outer side of the brake disc 20 as viewed in the vehicle lateral direction. The brake pad 22 functions as an outer pad. The brake pad 24 is located on the inner side of the brake disc 20 as viewed in the vehicle lateral direction, i.e., on the side closer to the piston 38, and functions as an inner pad.

The piston 38 is formed in the shape of a cup that its open toward the outer side in the vehicle lateral direction, and supports the back plate 24P of the brake pad 24 at its opening end (outer end). A cylinder boot 62 made of rubber is disposed between an outer end portion of the piston 38 and the opening of the cylinder hole 54, and the cylinder boot 62 extends annually around the outer end portion of the piston 38. Sliding portions of the piston 38 and the cylinder hole 54 are lubricated by grease 66. The grease 66 is also applied between the outer end portion of the piston 38 and the opening of the cylinder hole 54, and the cylinder boot 62.

When a braking force is generated by the braking force generation device 10 as described above, and a braking force is to be applied to wheel 12, a high-pressure brake oil 60 is supplied to the wheel cylinder chamber 56 via the port 58. The piston 38 slides to the right in FIG. 1 relative to the caliper 36, and presses the brake pad 24 against the brake disc 20. While the brake pad 24 and the piston 38 receive pressing reaction force from the brake disc 20, the volume of the wheel cylinder chamber 56 is not reduced. Accordingly, the slide pins 40 slide to the left in FIG. 1 relative to the caliper support member 34, and the caliper 36 moves to the left in FIG. 1 relative to the caliper support member 34 and the brake disc 20. As a result, the caliper 36 presses the brake pad 22 against the brake disc 20.

Thus, the piston 38 cooperates with the caliper 36 to function as the pressing device 26 that presses the brake pads 22 and 24 against the brake disc 20 with substantially the same pressing force on the opposite sides of the brake disc 20. The braking force due to frictional force is generated between the brake pads 22 and 24 and the brake disc 20, and is transmitted from the brake disc 20 to the wheel member 16, so that the wheel 12 is braked.

Conversely, when the braking force generation device 10 stops generating a braking force, and the wheel 12 ceases to be braked, a part of the high-pressure brake oil 60 in the wheel cylinder chamber 56 is discharged via the port 58. The piston 38 slides to the left in FIG. 1 relative to the caliper 36, and stops pressing the brake pad 24 against the brake disc 20. Since the brake pad 24 and the piston 38 cease to receive pressing reaction force from the brake disc 20, the slide pins 40 slides to the right in FIG. 1 relative to the caliper support member 34.

Accordingly, the caliper 36 moves to the right in FIG. 1 relative to the caliper support member 34 and the brake disc 20, and, as a result, the caliper 36 ceases to press the brake pad 22 against the brake disc 20. Accordingly, since the brake pads 22 and 24 are not pressed against the brake disc 20, no frictional force is generated between the brake pads 22 and 24, and the brake disc 20, and therefore, no braking force is applied to the wheel 12.

When the pressure of the brake oil 60 in the wheel cylinder chamber 56 is a standard pressure (e.g., the atmospheric pressure), the caliper 36 and the piston 38 are located at standard positions (non-braking positions) shown in FIG. 1, relative to the caliper support member 34 and the brake disc 20. Thus, the brake pads 22 and 24 are slightly spaced from the brake disc 20, or the brake pads 22 and 24 are in contact with the brake disc 20 without being pressed by the brake disc 20.

As shown in FIG. 1, a self-discharge type static charge eliminator 70A in the form of a strip is fixed by bonding to a cylindrical outer surface of a stepped portion 20S of the brake disc 20 so as to extend in a circumferential direction. Self-discharge type static charge eliminators 70B in the form of strips are fixed by bonding to the upper surface and lower surface of the back plate 24P of the brake pad 24, so as to extend substantially in circumferential directions. Self-discharge type static charge eliminators 70C in the form of strips are fixed by bonding to surfaces of portions of the caliper support member 34 which receives the slide pins 40. While the static charge eliminator 70C is illustrated in FIG. 1 such that it extends in a radial direction, for the sake of convenience in illustration, the static charge eliminator 70C preferably extends along the axis 42, as shown in FIG. 2.

A self-discharge type static charge eliminator 70D in the form of a strip is fixed by bonding to each flange portion 36F of the caliper 36 so as to extend substantially in a radial direction. Self-discharge type static charge eliminators 70E and 70F in the form of strips are fixed by bonding to a radially outer surface and a radially inner surface of the caliper 36, respectively, so as to extend in circumferential directions and perpendicularly to the axis 52. Further, a self-discharge type static charge eliminator 70G in the form of a strip is fixed by bonding to an outer end face of the caliper 36 as viewed in the vehicle lateral direction, so as to extend in a radial direction and perpendicularly to the axis 52. The static charge eliminator 70G may be fixed to an outer surface (as viewed in the vehicle lateral direction) of the back plate 22P of the brake pad 22.

Figure 3:
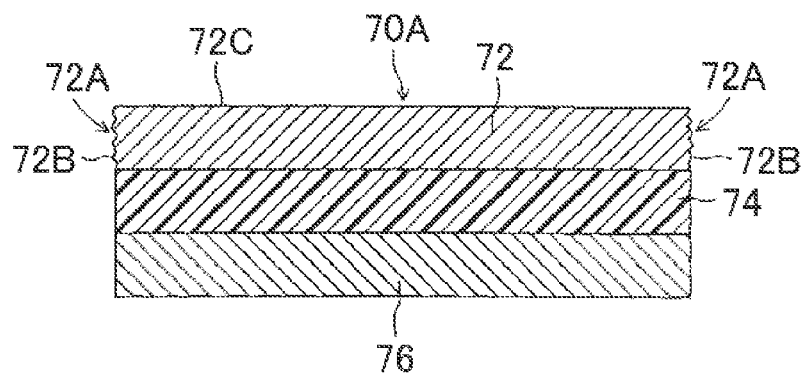
FIG. 3 is an enlarged cross-sectional view showing a self-discharge type static charge eliminator before it is bonded.

The self-discharge type static charge eliminators 70A-70G have the same structure. Accordingly, only the static charge eliminator 70A will be described with reference to FIG. 3 showing a cross-section of the static charge eliminator 70A before it is bonded to the brake disc 20. As shown in FIG. 3, a composite sheet is formed by applying a conductive adhesive 74 to a conductive metal foil 72, and attaching a release paper 76 that covers the adhesive 74 to the adhesive 74, and the static charge eliminator 70A is formed by shearing or cutting the composite sheet into suitable size and shape. To fix the static charge eliminator 70A to a member to be neutralized, the release paper 76 is peeled off, and the metal foil 72 is bonded to the member with the adhesive 74.

During operation of the braking force generation device 10, the temperatures of members, such as the brake disc 20, to which the self-discharge type static charge eliminators 70A-70G are fixed become high due to friction heat. Accordingly, the adhesive 74 has a resistance to heat, and keeps a condition where the static charge eliminator is fixed to the corresponding member even at a high temperature. If needed, a mechanically fixing means, such as a screw and a holding plate, may be used as an auxiliary means for fixing the static charge eliminator to the corresponding member. Further, the static charge eliminator may be fixed to the member to be neutralized, by a mechanically fixing means, such as a screw and a holding plate, without using any adhesive.

As will be described in detail later, side surfaces 72A of the metal foil 72, namely, surfaces that extend along the thickness direction of the metal foil, function primarily as discharge surfaces in a neutralizing phenomenon as will be described later. Accordingly, the side surfaces 72A of the metal foil 72 preferably have a multiplicity of protrusions 72B (i.e. minute protrusions extending from side surface 72A), so that the neutralizing phenomenon takes place efficiently. Also, a surface 72C (upper surface in FIG. 3) of the metal foil 72 may be subjected to machining for increasing the surface roughness, so that a multiplicity of protrusions (similar to protrusions 72B) are formed on the surface of the metal foil 72.

As will be described in detail later, the metal foil 72 may be formed of any metal having electric conductivity, but is preferably formed of aluminum, gold, silver, copper, or an alloy thereof. In particular, when the static charge eliminator is fixed to a metal member, as in this embodiment, the metal foil of the static charge eliminator preferably has a higher conductivity than a metal material that forms the metal member. Further, the thickness of the metal foil 72 is preferably about 50-200 μm, so that the side surfaces of the metal foil 72 can sufficiently function as discharge surfaces, and so that the metal foil 72 can be fixed to a curved surface while being deformed so as to flexibly conform to the curved surface.

The planar shape of the static charge eliminator 70A is not limited to the strip-like rectangular shape, but may be any shape, such as a polygonal shape other than the rectangular shape, or a circular or elliptical shape. However, the static charge eliminator 70A is preferably formed in a shape, such as a rectangle, square, rhomboid, or a hexagon, which permits shearing or cutting without producing any portions to be discarded. The size of the static charge eliminator 70A may be set as appropriate depending on the location where it is used, but, in the case where the static charge eliminator 70A has a rectangular shape, for example, the short sides of the rectangle may be approximately several millimeters to a dozen of millimeters, while the long side may be about several tens of millimeters to a hundred millimeters.

As described above, when the vehicle runs, the vehicle is positively charged, and therefore, metal members, such as the caliper support member 34 and the caliper 36, which constitute the braking force generation device 10, are positively charged. If the metal members are positively charged, and the quantity of the electric charge is increased, a portion of the charge moves to oil materials, such as the brake oil 60 and the grease 50, 66, which contact with the metal members. As a result, the quantity of charge of the oil material is increased, and thus, its viscosity is increased. If the viscosity of the oil material is increased, the viscosity resistance of the oil material during operation of the braking force generation device 10 is increased. Accordingly, it is desirable to eliminate charge of the metal members, such as the caliper support member 34 and the caliper 36, by means of the static charge eliminator 70A, etc., so as to reduce the charge quantities of the brake oil 60 and the grease 50, 66.

Figure 4A:
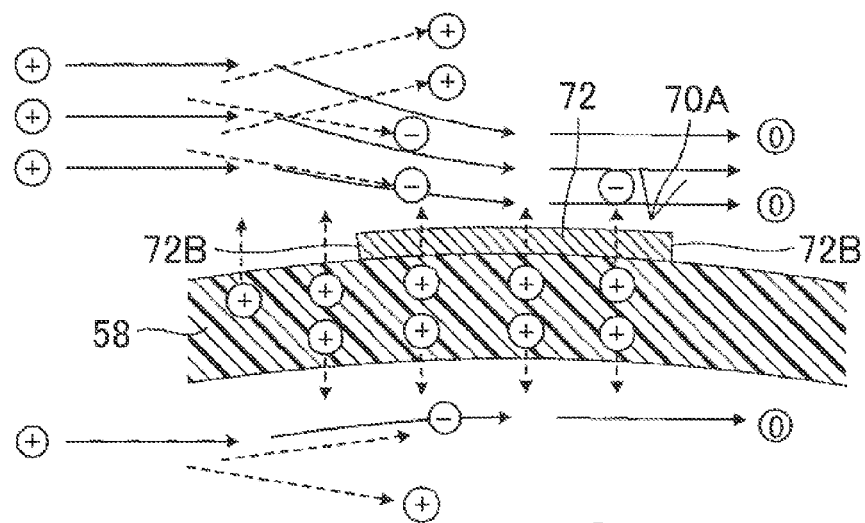
FIGS. 4A and 4B are schematic explanatory views showing a mechanism of neutralization by the self-discharge type static charge eliminator.
Figure 4B:
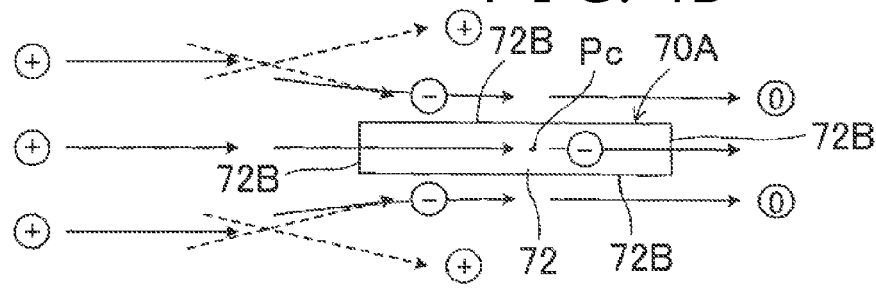

FIGS. 4A and 4B are a schematic explanatory views showing a mechanism of neutralization by the static charge eliminator 70A, and the neutralization is presumed to be performed by the static charge eliminator 70A by use of the mechanism shown in FIGS. 4A and 4B. In FIGS. 4A and 4B, "+" and "−" represent positive and negative charges or ions, and "0" indicates that charge is equal to 0, namely, indicates an electrically neutralized condition. Also, in FIGS. 4A and 4B, solid-line arrows indicate flow of air, and broken-line arrows indicate flow of charges or ions.

The air is positively charged. However, if the quantity of positive charge carried by the brake disc 20 is considerably increased, the air is separated into positive air ions and negative air ions through so-called corona discharge, at around the static charge eliminator 70A, in particular, around the side surfaces 72A of the metal foil 72 which has the multiplicity of protrusions 72B. The positive air ions move away from the brake disc 20, due to a repulsive force that acts between the positive air ions and the positive charge carried by the brake disc 20. On the other hand, the negative air ions are attracted toward the brake disc 20, due to Coulomb force that acts between the negative air ions and the positive charge carried by the brake disc 20, so that the negative air ions move to be close to the brake disc 20, and the positive charge carried by the brake disc 20 moves to be close to the negative air ions.

As a result, electrical neutralization takes place between the negative air ions and the positive charge, and the negative air ions and the positive charge disappear, so that electric charge of the air becomes equal to 0. Since the above-described phenomenon occurs repeatedly and continuously, the positive charge carried by the brake disc 20 are reduced, whereby the brake disc 20 is neutralized. The air is more likely to be separated into positive air ions and negative air ions through corona discharge as the charge quantity of the brake disc 20 is larger; therefore, neutralization is presumed to be more active as the charge quantity is larger. The neutralization by the static charge eliminator 70A is not limited to the situation where air flows in one direction, as shown in FIGS. 4A and 4B. Further, when the static charge eliminator is fixed to a plate-like member, as shown in FIGS. 4A and 4B, neutralization is also effected on one side of the plate-like member opposite to the static charge eliminator.

According to the result of experimental research conducted by the inventor, when the metal foil 72 (an aluminum foil having a thickness of 200 μm) of the static charge eliminator 70A has a rectangular shape of the above-indicated dimensions, or another shape of substantially the same size, the range in the planar direction having the effect of the neutralization is the range of about 50 mm in radius from the center Pc of the metal foil 72. Also, the range in the thickness direction having the effect of neutralization is the range of several millimeters to a dozen of millimeters from the surface to which the metal foil 72 is attached, within the range in the planar direction having the effect of the neutralization. The range having the effect of the neutralization changes depending on conditions, such as the quantity of positive charge. The surfaces of the static charge eliminators 70A-70G which are bonded to members, such as the brake disc 20, lie within the ranges in which the effect of the neutralization is exerted or provided by the corresponding static charge eliminators. Through experimental research conducted by the inventor, it was found that neutralization effected by the above-described mechanism has no temperature dependence, and the self-discharge type static charge eliminators perform effective neutralizing actions at high temperatures.

Since the static charge eliminator 70A is fixed to the cylindrical outer surface of the stepped portion 20S of the brake disc 20, the quantity of charge carried by the brake disc 20 is reduced by the static charge eliminator 70A. Since the static charge eliminators 70B are fixed to the upper surface and lower surface of the back plate 24P of the brake pad 24, the quantity of charge carried by the back plate 24P of the brake pad 24 is reduced by the static charge eliminators 70B, so that the quantity of charge carried by the friction material 24A is also reduced.

Since the static charge eliminators 70C are fixed to the surfaces of the portions of the caliper support member 34 which receive the slide pins 40, the quantity of charge carried by the portions receiving the slide pins 40 is reduced by the static charge eliminators 70C, so that the quantity of charge carried by the grease 50 is also reduced. Since the static charge eliminators 70D are fixed to the flange portions 36F of the caliper 36, the quantity of charge carried by the flange portions 36F and the slide pins 40 is reduced by the static charge eliminators 70D, so that the quantity of charge carried by the grease 50 is also reduced.

Since the static charge eliminators 70E and 70F are fixed to the radially outer surface and radially inner surface of the caliper 36, respectively, the quantity of charge carried by the caliper 36 is reduced by the static charge eliminators 70E and 70F, so that the quantity of charge carried by the grease 66 is also reduced. Further, since the static charge eliminator 70G is fixed to the outer end face of the caliper 36 as viewed in the vehicle lateral direction, the quantity of charge carried by the outer portion of the caliper 36 as viewed in the vehicle lateral direction is reduced. Accordingly, the quantity of charge carried by the back plate 22P of the brake pad 22 is reduced, and the quantity of charge carried by the friction material 22A is also reduced.

In the case of a painted metal member, such as the caliper support member 34, a coating film as well as the metal member is electrically charged, but electric charges carried by the coating film close to the static charge eliminator move to the static charge eliminator, so as to be reduced. Also, electric charges carried by the metal member pass through the coating film and move to the static charge eliminator, so as to be reduced. Further, electric charges carried by a portion of the coating film remote from the static charge eliminator once move to the metal member and move within the metal member, and then move from the metal member to the static charge eliminator through the coating film.

As is understood from the above description, according to the first embodiment, the grease 50 and 66 in the braking force generation device 10 can be prevented from being excessively charged with positive charges. Accordingly, the viscosity of the grease 50 and 66 is prevented from being excessively increased due to excessive charging, which makes it possible to assure a condition where sliding movements of the slide pins 40, etc. lubricated by the grease 50 and 60 are smoothly made.

In particular, according to the first embodiment, both of the grease 50 (that lubricates sliding portions of the slide pins 40 and the caliper support member 34), and the grease 66 (that lubricates sliding portions of the piston 38 and the caliper 36) are prevented from being excessively charged with a positive charge. Accordingly, sliding movements can be smoothly made in the braking force generation device 10, as compared with a case where only one of the grease 50 and the grease 66 is prevented from being excessively charged.

Further, according to the first embodiment, the pressing device 26 is the floating type pressing device. Namely, the slide pins 40 slide relative to the caliper support member 34, so that the caliper 36 is displaced relative to the caliper support member 34 and the knuckle 30, and the piston 38 is displaced by sliding relative to the caliper 36. Accordingly, it is understood from the first embodiment that in the case where the caliper support member is a stationary member, and the caliper and the piston are displacement members that are displaced by sliding relative to the caliper support member and the caliper, respectively, the grease of the sliding portions of the displacement members can be prevented from being excessively charged.

Figure 5:
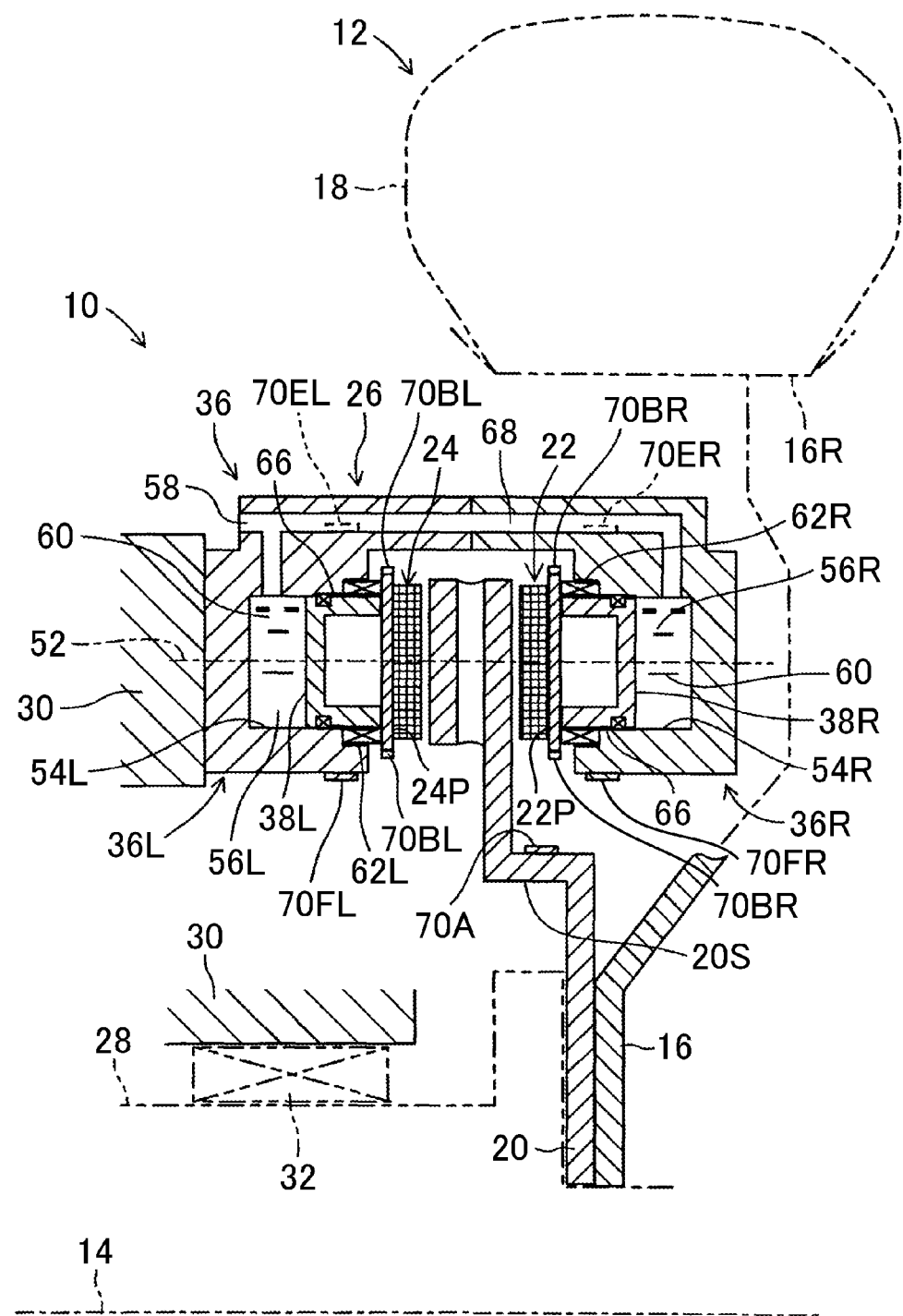
FIG. 5 is a cross-sectional view schematically showing a braking force generation device according to a second embodiment, which is used for an opposed-piston caliper type disc brake.

FIG. 5 is a cross-sectional view schematically showing a braking force generation device 10 according to a second embodiment, which is used for an opposed-piston caliper type disc brake. In FIG. 5, the same reference numerals as those used in FIG. 1 are assigned to members corresponding to the members shown in FIG. 1. In particular, the same numerals as those assigned to the corresponding members in FIG. 1, followed by L and R as appropriate, are assigned to members disposed on the opposite sides of the brake disc 20 and having the relationship of mirror images for each other.

In this embodiment, a pressing device 26 does not have the caliper support member 34 and the slide pins 40 used in the first embodiment. A caliper 36 has an inner portion 36L as viewed in the vehicle lateral direction, and an outer portion 36R as viewed in the vehicle lateral direction. Inner portion 36L and outer portion 36R have a relationship of mirror images with respect to a virtual center plane of a radially outer portion of a brake disc 20. The inner portion 36L and the outer portion 36R are integrally joined to each other. The inner portion 36L of the caliper 36 is connected to a knuckle 30, and the caliper 36 functions as a stationary member that does not move relative to the knuckle 30.

Each of the inner portion 36L and the outer portion 36R is provided with substantially the same structure as that of the first embodiment including the cylinder hole 54, etc. Namely, the inner portion 36L has a cylinder hole 54L that extends along an axis 52 parallel to a rotational axis 14 and is open outward in the vehicle lateral direction. A piston 38L is inserted in the cylinder hole 54L, such that the piston 38L can slidably reciprocate along the axis 52. The piston 38L cooperates with the cylinder hole 54L to form a wheel cylinder chamber 56L.

The piston 38L takes the form of a cup that is open outward in the vehicle lateral direction, and supports a back plate 24P of a brake pad 24 at its opening end. A cylinder boot 62L made of rubber is disposed between an outer end portion of the piston 38L and the opening of the cylinder hole 54L, and the cylinder boot 62L extends annually around the outer end portion of the piston 38L. Sliding portions of the piston 38L and the cylinder hole 54L are lubricated by grease 66. The grease 66 is also applied to between the outer end portion of the piston 38L and the opening of the cylinder hole 54L, and the cylinder boot 62L.

Similarly, the outer portion 36R has a cylinder hole 54R that extends along the axis 52 and is open inward in the vehicle lateral direction. A piston 38R is inserted in the cylinder hole 54R such that the piston 38R can slidably reciprocate along the axis 52. The piston 38R cooperates with the cylinder hole 54R to form a wheel cylinder chamber 56R. The wheel cylinder chamber 56R is connected to the wheel cylinder chamber 56L via an internal passage 68, and the internal passage 68 communicates with a port 58. With this arrangement, high-pressure brake oil 60 is supplied to and discharged from the wheel cylinder chambers 56L and 56R, via the port 58 and the internal passage 68.

The piston 38R is formed in the shape of a cup that opens inward in the vehicle lateral direction, and supports a back plate 22P of a brake pad 22 at its opening end. A cylinder boot 62R made of rubber is disposed between an outer end portion of the piston 38R and the opening of the cylinder hole 54R, and the cylinder boot 62R extends annually around the outer end portion of the piston 38R. Sliding portions of the piston 38R and the cylinder hole 54R are lubricated by grease 66. The grease 66 is also applied between the outer end portion of the piston 38R and the opening of the cylinder hole 54R, and the cylinder boot 62R.

When braking force is generated by the braking force generation device 10 constructed as described above, and a braking force is applied to the wheel 12, the high-pressure brake oil 60 is supplied to the wheel cylinder chambers 56L and 56R, via the port 58 and the internal passage 68. The piston 38L slides to the right in FIG. 5 relative to the inner portion 36L of the caliper 36, so as to press the brake pad 24 against the brake disc 20. Similarly, the piston 38R slides to the left in FIG. 5 relative to the outer portion 36R of the caliper 36, so as to press the brake pad 22 against the brake disc 20. As a result, the brake disc 20 is sandwiched between the brake pads 22 and 24, and braking force is generated due to frictional force produced between the brake pads 22 and 24 and the brake disc 20. The braking force is transmitted from the brake disc 20 to the wheel member 16, so that the wheel 12 is braked.

Conversely, when the braking force generation device 10 stops generating braking force, and the wheel 12 ceases to be braked, a part of the high-pressure brake oil 60 in the wheel cylinder chambers 56L and 56R is discharged via the internal passage 68 and the port 58. The piston 38L slides to the left in FIG. 1 relative to the caliper 36, so that the brake pad 24 ceases to be pressed against the brake disc 20. Similarly, the piston 38R slides to the right in FIG. 1 relative to the caliper 36, so that the brake pad 22 ceases to be pressed against the brake disc 20. Accordingly, since the brake pads 22 and 24 are no longer pressed against the brake disc 20, no frictional force is generated between the brake pads 22 and 24, and the brake disc 20, and no braking force is applied to the wheel 12.

Thus, the inner portion 36L of the caliper 36 and the piston 38L cooperate with each other to function as a part of the pressing device 26 for pressing the brake pad 24 against the brake disc 20. Similarly, the outer portion 36R of the caliper 36 and the piston 38R cooperate with each other to function as a part of the pressing device 26 for pressing the brake pad 22 against the brake disc 20.

As shown in FIG. 5, a self-discharge type static charge eliminator 70A, in the form of a strip, is fixed by bonding to a cylindrical outer surface of a stepped portion 20S of the brake disc 20, so as to extend vertically in a radial direction, as in the first embodiment. Self-discharge type static charge eliminators 70BL and 70BR in the form of strips are fixed by bonding to an upper surface and a lower surface of a back plate 24P of the brake pad 24 and an upper surface and a lower surface of a back plate 22P of the brake pad 22, respectively, so as to extend substantially in radial directions.

Self-discharge type static charge eliminators 70EL and 70ER in the form of strips are fixed by bonding to radially outer surfaces of the inner portion 36L and outer portion 36R of the caliper 36, respectively, so as to extend in radial directions and perpendicularly to the axis 52. Similarly, self-discharge type static charge eliminators 70FL and 70FR in the form of strips are fixed by bonding to radially inner surfaces of the inner portion 36L and outer portion 36R of the caliper 36, respectively, so as to extend in radial directions and perpendicularly to the axis 52. Static charge eliminators corresponding to the self-discharge type static charge eliminators 70C, 70D and 70G of the first embodiment are not fixed.

As in the case of the first embodiment, the quantity of charge carried by the brake disc 20 is reduced by the static charge eliminator 70A fixed to the brake disc 20. The static charge eliminators 70BL and 70BR are fixed to the back plates 24P and 22P of the brake pads 24 and 22, respectively. Accordingly, the quantities of charge carried by the back plates 24P and 22P of the brake pads 24 and 22 are reduced by the static charge eliminators 70BL and 70BR, so that the quantities of charge carried by the friction materials 24A and 22A are also reduced.

The static charge eliminators 70EL and 70ER are fixed to the radially outer surfaces of the inner portion 36L and outer portion 36R of the caliper 36, respectively. Similarly, the static charge eliminators 70FL and 70FR are fixed to the radially inner surfaces of the inner portion 36L and outer portion 36R of the caliper 36, respectively. Accordingly, the quantity of charge carried by the caliper 36 is reduced by the static charge eliminators 70EL, 70ER, 70FL and 70FR, so that the quantity of charge carried by the grease 66 is also reduced.

As is understood from the above description, according to the second embodiment, grease 66 in the braking force generation device 10 is prevented from being excessively charged with positive charges. Accordingly, the viscosity of the grease 66 is prevented from being excessively increased due to excessive charging, which makes it possible to assure a condition where sliding movements of the pistons 38L and 38R, etc. lubricated by the grease 66 are smoothly made.

In particular, according to the second embodiment, the pressing device 26 is the opposed-piston type pressing device. Namely, the caliper 36 is not displaced relative to the knuckle 30, and the pistons 38L and 38R are displaced by sliding relative to the caliper 36 on the opposite sides of the brake disc 20. Accordingly, it is understood from the second embodiment that in the case where the caliper is a stationary member, and the pair of pistons are displacement members that are displaced by sliding relative to the caliper, the grease around the pistons can be prevented from being excessively charged.

Through experimental research conducted by the inventor, it was found that positive charges carried by the brake disc 20, etc. have an influence on the response of the braking force generation device 10. Namely, if the brake disc 20, etc. are charged with positive charges, repulsive force due to static electricity acts between the brake disc 20 and the brake pads 24 and 22. Also, if a situation where the brake pads 24 and 22 are pressed against the brake disc 20 and slide by friction continues, charges carried by the friction material change from positive charges to negative charges, depending on the constituent material of the friction materials 22A and 24A. If this situation occurs, attractive force due to static electricity acts between the brake disc 20 and the brake pads 24 and 22.

According to the first and second embodiments, the influence of the electrostatically-induced repulsive force and attractive force acting between the brake disc 20 and the brake pads 24 and 22 on the response of the braking force generation device 10 can be reduced. In the following, this point will be further described in detail with reference to FIG. 6 and FIG. 7.

Figure 6:
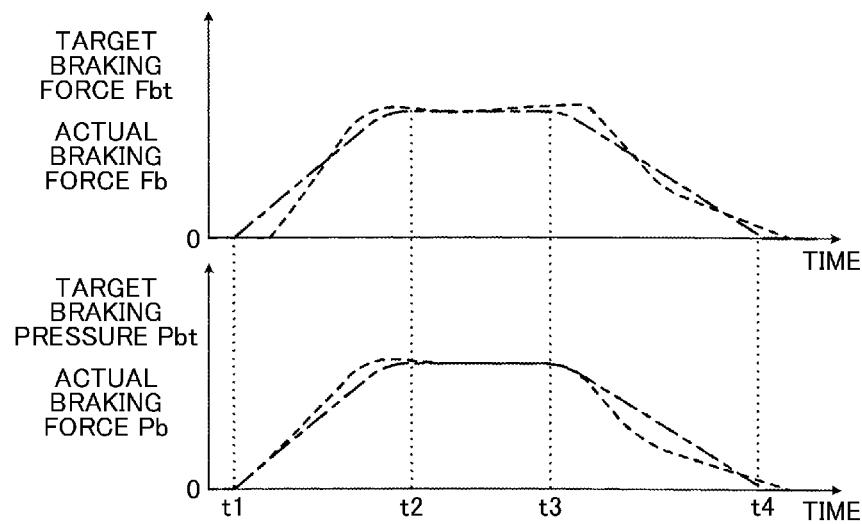
FIG. 6 is an explanatory view exaggeratingly showing an example of changes of a target braking force Fbt and a target braking pressure Pbt in a conventional braking force generation device having no self-discharge type static charge eliminator for neutralization, and changes of the actual braking force Fb and the actual braking pressure Pb corresponding to the target braking force Fbt and the target braking pressure Pbt.
Figure 7:
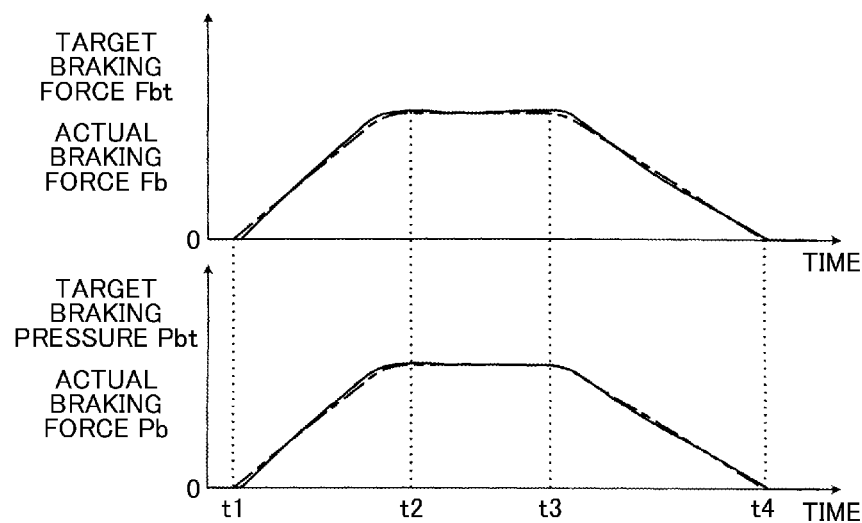
FIG. 7 is an explanatory view showing an example of changes of the target braking force Fbt and the target braking pressure Pbt in the first or second embodiment, and changes of the actual braking force Fb and the actual braking pressure Pb corresponding to the target braking force Fbt and the target braking pressure Pbt.

FIG. 6 and FIG. 7 show examples of changes of the target braking force Fbt and the target braking pressure Pbt in a conventional braking force generation device in which neutralization is not performed by self-discharge type static charge eliminators (FIG. 6), and those in the first or second embodiments, and changes of the actual braking force Fb and the actual braking pressure Pb in the corresponding devices (FIG. 7), when exaggerated. In particular, in FIG. 6 and FIG. 7, the target braking force Fbt and target braking pressure Pbt corresponding to the amount of braking operation by the driver start increasing from 0 at time t1, are kept constant from time t2 to time t3, start decreasing at time t3, and become equal to 0 at time t4.

In the case of the conventional braking force generation device, if the brake disc 20, etc. are electrically charged, and the quantity of electric charge carried by the brake disc 20, etc. is increased, the repulsive force that acts between the brake disc 20 and the brake pads 24 and 22 is increased. Therefore, even if the driver starts braking operation at time t1, so as to increase the actual braking pressure Pb according to increase of the target braking pressure Pbt, the brake disc 20 cannot be pressed against the brake pads 24 and 22 for a while, and the actual braking force Fb remains equal to 0.

In order to deal with this situation, the driver increases the braking operation amount at a high rate. As a result, the actual braking pressure Pb increases at a higher rate than the rate of increase of the target braking pressure Pbt, and becomes higher than the target braking pressure Pbt in a time region earlier than time t2. Accordingly, the actual braking force Fb is likely to be lower than the target braking force Fbt in the initial period following the start of braking, and then, is likely to be higher than the target braking force Fbt.

Also, even if the actual braking pressure Pb is reduced according to reduction of the target braking pressure Pbt at time t3, a condition in which the brake pads 24 and 22 and the brake disc 20 are pressed against each other due to attractive force therebetween is continued for a while, and the actual braking force Fb is not reduced. Since the deceleration of the vehicle is not reduced as desired, the driver reduces the braking operation amount at a high reduction rate. As a result, the actual braking pressure Pb is reduced at a higher rate than that of the target braking pressure Pbt, and the actual braking force Fb is reduced in a corresponding way at a higher rate than that of the target braking force Fbt. Accordingly, the actual braking force Fb is likely to be higher than the target braking force Fbt in the initial period of termination of braking, and then, the actual braking force Fb is likely to be lower than the target braking force Fbt.

On the other hand, according to the first and second embodiments, the quantity of charge carried by the brake disc 20 and the brake pads 24, 22 can be reduced, through neutralization by the self-discharge type static charge eliminators. Accordingly, the repulsive force and attractive force due to static electricity, which act between the brake disc 20 and the brake pads 24 and 22, can be reduced, and the influence of the repulsive force and attractive force on the pressing force between the brake disc 20 and the brake pads 24 and 22 can be reduced. Accordingly, as shown in FIG. 7, the actual braking pressure Pb and the actual braking force Fb are more likely to follow the target braking pressure Pbt and the target braking force Fbt, respectively, with improved accuracy.

In particular, in a vehicle in which regenerative braking is performed, when control of braking force, such as vehicle motion control, is started, regenerative braking force is replaced with equivalent friction braking force. Conversely, when the control of braking force is finished, a part of the friction braking force is replaced with equivalent regenerative braking force. However, if the brake disc 20, etc., are electrically charged, and repulsive force and attractive force due to static electricity act between the brake disc 20 and the brake pads 24 and 22, the regenerative braking force and the friction braking force cannot be smoothly replaced with each other, and deceleration shock is likely to be generated.

On the other hand, according to the first and second embodiments, the repulsive force and attractive force due to static electricity, which act between the brake disc 20 and the brake pads 24 and 22, can be reduced by neutralization. Accordingly, in the vehicle in which regenerative braking is performed, the regenerative braking force and the friction braking force can be smoothly replaced with each other, so that deceleration shock is less likely or unlikely to be generated, and the braking force of the vehicle as a whole can be prevented from being unnaturally changed.

Figure 8:
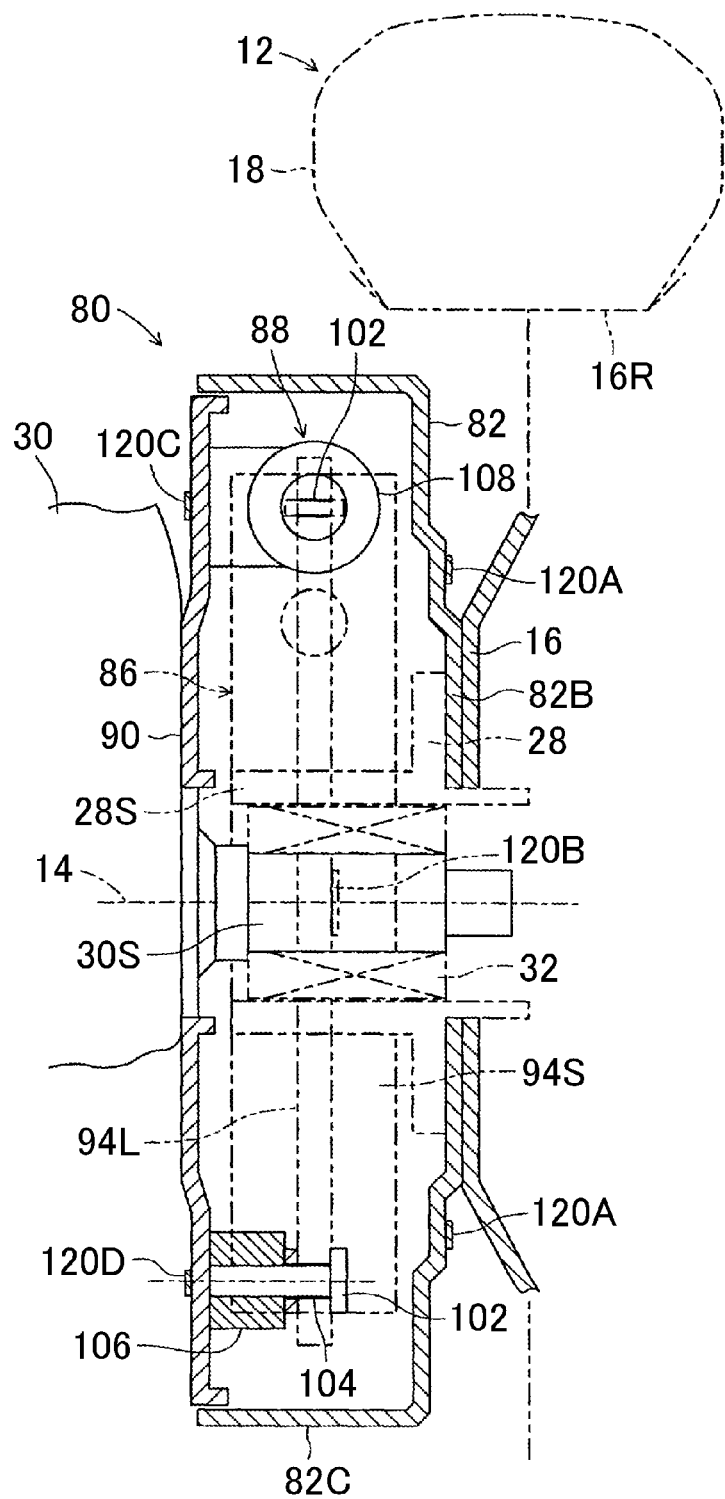
FIG. 8 is a cross-sectional view schematically showing a braking force generation device according to a third embodiment, which is used for a leading/trailing type drum brake.
Figure 9:
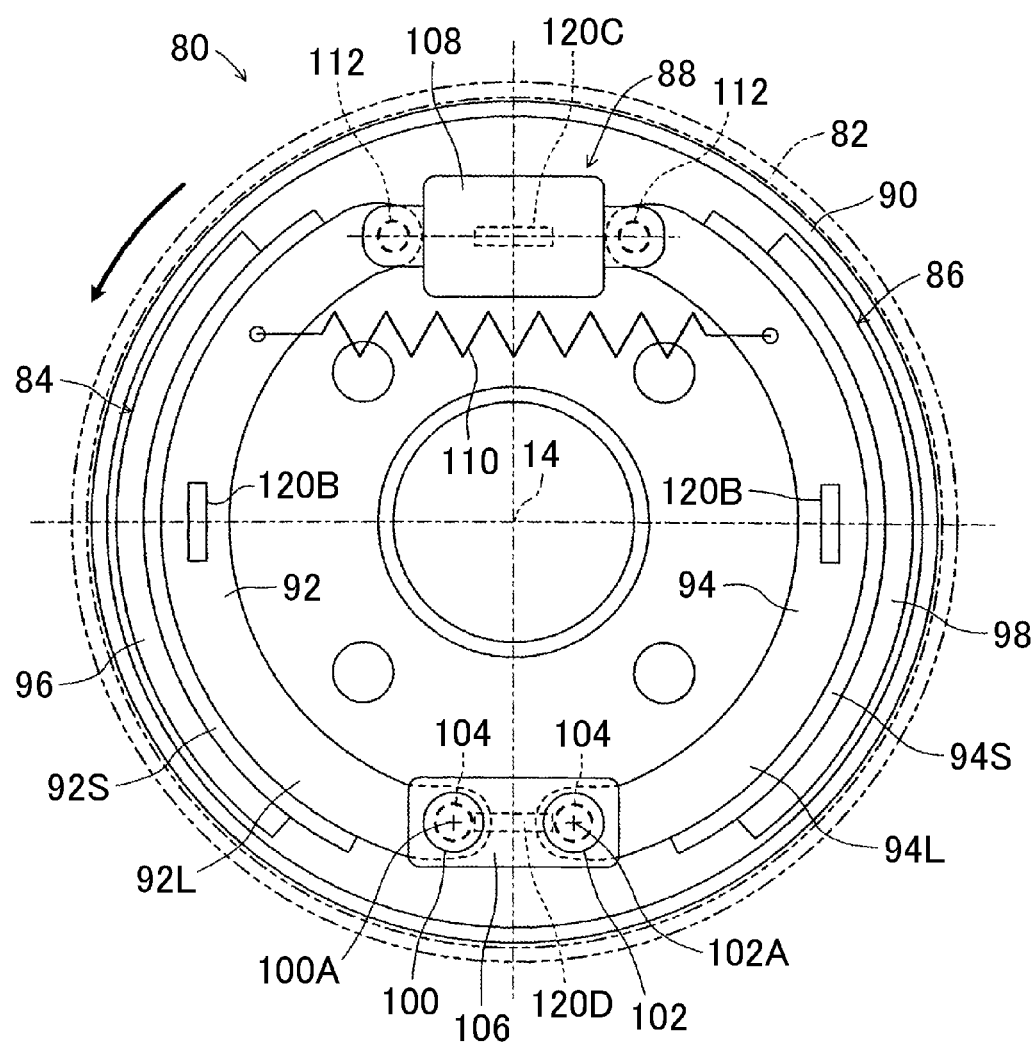
FIG. 9 is a front view schematically showing the braking force generation device from which a brake drum is removed.

FIG. 8 is a cross-sectional view schematically showing a braking force generation device 80 according to a third embodiment, which is used for a leading/trailing type drum brake. FIG. 9 is a front view schematically showing the braking force generation device 80 from which a brake drum is removed. In FIG. 8, the same reference numerals as those used in FIG. 1 are assigned to members corresponding to the members shown in FIG. 1.

In FIG. 8 and FIG. 9, the braking force generation device 80 is a leading/trailing type drum brake, and has a brake drum 82 as a rotary member that rotates about a rotational axis 14 along with a wheel 12. The braking force generation device 80 further has a pair of brake shoes 84 and 86 as friction members, and a pressing device 88 including a wheel cylinder device 108 that presses the brake shoes 84 and 86 against the brake drum 82.

As well known in the art, the brake drum 82 is in the form of a circular bowl, and has a base portion 82B in the form of a substantially annular plate perpendicular to the rotational axis, and a cylindrical portion 82C that is connected integrally with an outer peripheral portion of the base portion 82B and extends perpendicularly to the base portion 82B. The base portion 82B is integrally fastened by bolts, along with a wheel member 16, to a flange portion of an axle hub 28, and the cylindrical portion 82C is located on the inner side of the base portion 82B as viewed in the vehicle lateral direction. In this embodiment, the wheel 12 is a driven wheel, and a spindle 30S formed integrally with the knuckle 30 is inserted through a sleeve portion 28S of the axle hub 28. The axle hub 28 is supported by the spindle 30S via a bearing 32 such that the axle hub 28 is rotatable about the rotational axis 14.

A back plate 90 in the form of a substantially annular plate perpendicular to the rotational axis is disposed on the radially inner side of the cylindrical portion 82C. Although not illustrated in the drawings, the back plate 90 is mounted integrally to the knuckle 30 by bolts, and an outer peripheral portion of the back plate 90 is slightly spaced radially inwards from an inner end portion of the cylindrical portion 82C as viewed in the vehicle lateral direction opposite to the base portion 82B in the axial direction. Thus, the back plate 90 functions as a support member, and the brake drum 82 rotates about the rotational axis 14 relative to the back plate 90.

The brake shoes 84 and 86 are disposed on the radially inner side of the cylindrical portion 82C of the brake drum 82, on the opposite sides of the rotational axis 14 as viewed in the longitudinal direction of the vehicle. The brake shoes 84 and 86 have shoe bodies 92 and 94 made of metal, and friction materials 96 and 98 formed of a friction material, respectively.

The shoe bodies 92 and 94 have friction material support portions 92S and 94S, and rib portions 92L and 94L. The friction material support portions 92S and 94S are substantially in the form of plates that extend arcuately along the cylindrical portion 82C and also extend along the rotational axis 14. The rib portions 92L and 94L are formed integrally with the friction material support portions 92S and 94S, and extend arcuately along a plane perpendicular to the rotational axis 14. The friction materials 96 and 98 are fixed integrally to radially outer surfaces of the friction material support portions 92S and 94S, respectively, and are opposed to the inner surface of the cylindrical portion 82C of the brake drum 82.

The shoe bodies 92 and 94 are respectively supported by pins 100 and 102 inserted through lower end portions of the rib portions 92L and 94L, such that the shoe bodies 92 and 94 can pivot about their axes 100A and 102A parallel to the rotational axis 14. Sliding portions between the rib portions 92L and 94L and the pins 100 and 102 are lubricated by grease 104. The pins 100 and 102 are fixed to a pin support (anchor) 106 fixed to the back plate 90. The pins 100 and 102 may be supported by a shoe adjuster that can adjust the interval between the pins 100 and 102.

The wheel cylinder device 108 is disposed between the free ends (upper ends) of the shoe bodies 92 and 94, such that the device 108 is fixedly attached to the back plate 90. A return spring 110 is disposed at a location that is closer to the lower ends than the free ends of the shoe bodies 92 and 94, and is connected to the rib portions 92L and 94L. Accordingly, the brake shoes 84 and 86 are biased toward each other under spring force of the return spring 110, about the pins 100 and 102 as points of support.

The wheel cylinder device 108 has a structure of a known piston-cylinder device. When brake oil is supplied to and discharged from a cylinder chamber, the distance between opposite end portions increases and decreases by expansion and contraction. One end and the other end of the wheel cylinder device 108 are relatively pivotally connected by pins, for example, to the rib portion 92L of the shoe body 92 and the rib portion 94L of the shoe body 94, respectively. When the wheel cylinder device 108 expands and contracts, the rib portions 92L and 94L slightly pivot relative to the opposite ends of the wheel cylinder device 108, and their connecting portions slide. Accordingly, the connecting portions between the opposite ends of the wheel cylinder device 108 and the rib portions 92L and 94L are lubricated by grease 112.

In particular, when the wheel cylinder device 108 expands, the upper end portions of the brake shoes 84 and 86 are driven away from each other, and the brake shoes 84 and 86 are caused to pivot about the pins 100 and 102 as points of support, respectively, to move away from each other. As a result, the friction material support portions 92S and 94S are pressed against the inner surface of the cylindrical portion 82C of the brake drum 82. Thus, the wheel cylinder device 108 cooperates with the pins 100 and 102 to constitute the pressing device 88 for pressing the brake shoes 84 and 86 against the brake drum 82.

When the vehicle (not shown) runs forward, the brake drum 82 rotates in the direction indicated by the arrow in FIG. 9. In this case, the brake shoe 84 is brought into friction contact with the brake drum 82 on the leading side in the rotational direction of the brake drum 82 with respect to the pin 100. On the other hand, the brake shoe 86 is brought into friction contact with the brake drum 82 on the trailing side in the rotational direction of the brake drum 82 with respect to the pin 102. Thus, the brake shoes 84 and 86 function as a leading brake shoe and a trailing brake shoe, respectively.

When braking force is to be generated by the braking force generation device 80, high-pressure brake oil is supplied to the cylinder chamber of the wheel cylinder device 108, and the wheel cylinder device 108 is expanded. The brake shoes 84 and 86 are caused to pivot about the pins 100 and 102, respectively, in directions away from each other, so that the friction materials 96 and 98 are pressed against the inner surface of the cylindrical portion 82C of the brake drum 82. As a result, torque against rotation of the brake drum 82 is generated by frictional force generated between the friction materials 96 and 98 and the inner surface of the cylindrical portion 82C of the brake drum 82, and the torque is transmitted as braking torque to the wheel 12, so that the wheel 12 is braked.

Conversely, when the braking force applied by the braking force generation device 80 is released, a part of the high-pressure brake oil is discharged from the cylinder chamber of the wheel cylinder device 108, and the wheel cylinder device 108 is contracted. Since the brake shoes 84 and 86 are biased toward each other about the pins 100 and 102, under spring force of the return spring 110, the pressing force of the friction materials 96 and 98 against the inner surface of the cylindrical portion 82C of the brake drum 82 is reduced. As a result, the frictional force generated between the friction materials 96 and 98 and the inner surface of the cylindrical portion 82C is reduced, and the torque against rotation of the brake drum 82 is reduced, so that the torque transmitted to the wheel 12 is reduced, and the braking force applied to the wheel 12 is reduced.

In this embodiment, as shown in FIG. 8, four self-discharge type static charge eliminators 120A in the form of strips are fixed by bonding to the outer surface of the brake drum 82 so as to vertically extend in radial directions, at positions spaced at intervals of 90° around the rotational axis 14. As shown in FIG. 9, self-discharge type static charge eliminators 120B in the form of strips are fixed by bonding to the rib portions 92L and 94L of the brake shoes 84 and 86, so as to extend in longitudinal directions.

As shown in FIG. 8 and FIG. 9, a self-discharge type static charge eliminator 120C in the form of a strip is fixed by bonding to an outer surface (a surface on the inner side in the vehicle lateral direction) of the back plate 90, at a position where the wheel cylinder device 108 is provided, so as to extend vertically in a radial direction. Further, a self-discharge type static charge eliminator 120D in the form of a strip is fixed by bonding to the outer surface of the back plate 90, at a position where the pin support 106 is provided, so as to extend vertically in a radial direction. The static charge eliminators 120A-120D have substantially the same structure as the static charge eliminators 70A-70G of the first embodiment.

Since the static charge eliminators 120A are fixed to the outer surface of the brake drum 82, the quantity of charge carried by the brake drum 82 is reduced by the static charge eliminators 120A. Since the static charge eliminators 120B are fixed to the rib portions 92L and 94L of the brake shoes 84 and 86, the quantity of charge carried by the friction material support portions 92S and 94S is reduced by the static charge eliminators 120B, so that the quantity of charge carried by the friction materials 96 and 98 is also reduced.

The static charge eliminator 120C is fixed to the outer surface of the back plate 90 at the position where the wheel cylinder device 108 is provided. Accordingly, the quantity of charge carried by the back plate 90 and the wheel cylinder device 108 is reduced by the static charge eliminator 120C, so that the quantity of charge carried by the grease 112 of the connecting portions between the opposite ends of the wheel cylinder device 108 and the rib portions 92L and 94L is also reduced. The wheel cylinder device 108 has a cylinder, and pistons fitted in the cylinder such that they can reciprocate in the cylinder, and the pistons and the cylinder are lubricated by grease. Thus, since the quantity of charge carried by the back plate 90 and the wheel cylinder device 108 is reduced by the static charge eliminator 120C, the quantity of charge carried by the grease in the wheel cylinder device 108 is also reduced.

Further, the static charge eliminator 120D is fixed to the outer surface of the back plate 90, at the position where the pin support 106 is provided. Thus, the quantity of charge carried by the back plate 90 and the pin support 106 is reduced by the static charge eliminator 120D, so that the quantity of charge carried by the grease 104 between the pins 100 and 102 and the pin support 106 is also reduced.

As is understood from the above description, according to the third embodiment, the grease 104, 112 in the braking force generation device 80 and the grease in the wheel cylinder device 108 can be prevented from being excessively charged with positive charges. Accordingly, the viscosities of the grease 104, 112 and the grease in the wheel cylinder device 108 are prevented from being excessively increased due to excessive charging, which makes it possible to assure a condition where the pivotal movements of the brake shoes 84 and 86 are smoothly made.

Also, in the third embodiment, too, positive charges are reduced which are carried by the brake drum 82 as the rotary member and both of the brake shoes 84, 86 as the friction members, which are brought into friction contact with each other so as to generate braking force from the frictional force. As a result, the repulsive force and attractive force due to static electricity that acts between the brake drum 82 and the brake shoes 84, 86 can be reduced. Accordingly, as in the cases of the first and second embodiments, the influence of the repulsive force and attractive force due to static electricity that acts between the brake drum 82 and the brake shoes 84, 86, on the response of the braking force generation device 80, can be reduced. Further, in a vehicle in which regenerative braking is performed, the regenerative braking force and friction braking force can be equivalently replaced with each other; therefore, deceleration shock is less likely or unlikely to occur, and the braking force applied to the vehicle as a whole is less likely or unlikely to be unnaturally changed.

With regard to the braking force generation devices 10 according to the above-described first and second embodiments and the braking force generation device 80 according to the third embodiment, the following effect was be confirmed, through experiments conducted by the inventor. Namely, in the case where the self-discharge type static charge eliminator 70A, etc. are not provided, the potential of the grease 50, etc. in the braking force generation devices 10 and 80 rose up to several hundreds to several thousands of volts. On the other hand, according to the arrangements of the first through third embodiments, the potential of the grease 50 only rose up to several tens of volts, and appropriate viscosity of the grease 50, etc. was ensured.

As is understood from the above description, the static charge eliminators, such as the self-discharge type static charge eliminator 70A, of each embodiment are so-called ion-separation-type, non-earthed, self-discharge static charge eliminators. Namely, the static charge eliminator 70A, for example, separates air into positive air ions and negative air ions through corona discharge, and eliminates charge through electric neutralization between positive charges carried by constituent members of the braking force generation devices 10 and 80 and negative air ions. Therefore, a special device and wiring for eliminating charge by earthing from a member that is in contact with grease are not needed. Further, as compared with the case where the electrostatic eliminator described in JP 2008-181694 A as identified above is used, the structure for eliminating charge in the braking force generation devices 10 and 80 is simplified, and the cost needed for achieving charge elimination or neutralization can be significantly reduced.

In particular, according to the first through third embodiments, positive charges carried by both of the rotary member and the friction member which are brought into friction contact with each other so as to generate braking force from frictional force are reduced. Accordingly, as compared with the case where positive charges carried by only one of the rotary member and the friction member are reduced, the repulsive force and attractive force that act between the rotary member and the friction member can be effectively reduced.

Also, according to the first through third embodiments, positive charges carried by a member, such as the caliper 36, which constitutes a wheel cylinder device, the wheel cylinder device 108, or a member, such as the back plate 90, which is connected to the wheel cylinder device 108 are reduced through neutralization by the static charge eliminators. Thus, positive charges carried by brake oil supplied to and discharged from the wheel cylinder device are reduced, and the viscosity of the brake oil is prevented from being increased. Accordingly, smooth reciprocating movements of the pistons in the wheel cylinder device can be assured, and therefore, smooth operation of the braking force generation devices 10 and 80 can be assured.

Further, according to the first through third embodiments, each of the static charge eliminators takes the form of a tape formed by attaching the conductive adhesive 74 to the conductive metal foil 72, and the static charge eliminator is fixed to a member to be neutralized, by bonding the metal foil 72 to the member to be neutralized, by means of the adhesive 74. Thus, the metal foil that eliminates charge can be easily fixed by bonding to the surface of the member to be neutralized. Further, since the adhesive layer has electric conductivity, charges are more efficiently moved from the particular member to the metal foil, so that the effect of neutralization can be enhanced, as compared with the case where the adhesive layer does not have electric conductivity. If the thickness of the adhesive layer is in the range of several tens to several hundreds of microns, charges can move from the particular member to the metal foil even if the adhesive layer does not have conductivity. Thus, the adhesive layer may not have electric conductivity.

While the particular embodiments have been described above in detail, these embodiments are not limited to the above-described embodiments, but it would be apparent to those skilled in the art that these embodiments can be practiced in various other embodiments within the scope of the this disclosure.

For example, in the first and second embodiments, the self-discharge type static charge eliminators 70A-70D are fixed to the brake disc 20, etc., but any one or more of the static charge eliminators 70A-70D may be omitted. Similarly, in the third embodiment, the self-discharge type static charge eliminators 120A-120D are fixed to the brake drum 82, etc. However, any one or more of the static charge eliminators 120A-120D may be omitted.

The positions at which the static charge eliminators are fixed, the number of static charge eliminators, and the direction of extension of each static charge eliminator are not limited to those of each of the above-described embodiments. For example, the static charge eliminators 70E and 70F in the first embodiment may be fixed to surfaces of the caliper 36 on the longitudinal sides of the vehicle with respect to the axis 52. Also, in each of the embodiments, any static charge eliminator fixed so as to extend in a direction perpendicular to a radial direction may be fixed so as to extend along a radial direction.

In each of the above-described embodiments, the pressing devices 26 and 88 that press the friction member against the rotating member are wheel cylinder devices that operate with brake oil supplied to and discharge from the devices. However, the pressing device may be an electromagnetic pressing device that is driven by electromagnetic force.

While the wheel 12 is a drive wheel in the first and second embodiments as described above, the braking force generation devices 10 of the first and second embodiments may be used for driven wheels. Similarly, while the wheel 12 is a driven wheel in the third embodiment, the braking force generation device 80 of the third embodiment may be used for a drive wheel.

In the third embodiment as described above, the support structure for the brake shoes 84 and 86 is of a pin anchor type. However, the support structure for the brake shoes may be of an adjuster anchor type or a floating anchor type. Also, while the braking force generation device 80 is used for the leading/trailing type drum brake, it may be used for a two-leading-shoe type drum brake. Further, while the braking force generation device 80 is used for a uni-servo type drum brake, it may be used for a duo-servo type drum brake.

According to the embodiments discussed above, it is possible to eliminate charge carried by grease in the braking force generation device, without requiring a special device, such as an electrostatic eliminator, and thereby prevent the viscosity of the grease from being increased due to charging and prevent the viscosity resistance from being increased.

What is claimed is:

1. A braking force generation device for a vehicle, the braking force generation device comprising:
    a rotary member rotating about a rotational axis along with a wheel;
    a friction member being supported so as not to rotate about the rotational axis;
    a pressing device including a stationary member and a displacement member, the stationary member, having sliding portions, being supported by a knuckle, the displacement member being operable to slide relative to the stationary member, support the friction member and press the friction member against the rotary member, sliding portions of the stationary member and the displacement member being lubricated by a lubricant; and
    at least two self-discharge type static charge eliminators including a conductive metal foil directly fixed on a surface of a particular member, respectively, so that the conductive metal foil contacts the surface of the particular member, the particular member being at least one of the rotary member, the friction member, the stationary member and the displacement member, wherein
    the at least two self-discharge type static charge eliminators are air-ion-exchange type self-discharge static charge eliminators, the air-ion-exchange type self-discharge static charge eliminators being configured to change air around the self-discharge type static charge eliminators into negative air ions, according to a quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant,
    wherein the rotary member, the friction member, the pressing device, the stationary member and the displacement member are each made of a metal material, and
    wherein
    the rotary member is a brake disc that rotates about the rotational axis;
    the friction member is a brake pad;
    the pressing device is a floating type pressing device;
    the stationary member is a caliper support member;
    the displacement member includes a caliper and a piston, the caliper being operable to slide relative to the caliper support member along an axis parallel to the rotational axis, the piston being operable to slide relative to the caliper and press the brake pad against the brake disc; and
    the particular member is at least one of the brake disc, the brake pad, the caliper support member and the caliper, wherein
    the electrically conductive metal foil has a multiplicity of protrusions and recesses at a side surface of an outer periphery, and a layer of an adhesive applied to one surface of the metal foil; and
    the self-discharge type static charge eliminator is fixed to the particular member by bonding using the layer of the adhesive.

2. A braking force generation device for a vehicle, the braking force generation device comprising:
    a rotary member rotating about a rotational axis along with a wheel;
    a friction member being supported so as not to rotate about the rotational axis;
    a pressing device including a stationary member and a displacement member, the stationary member, having sliding portions, being supported by a knuckle, the displacement member being operable to slide relative to the stationary member, support the friction member and press the friction member against the rotary member, sliding portions of the stationary member and the displacement member being lubricated by a lubricant; and
    at least two self-discharge type static charge eliminators including a conductive metal foil directly fixed on a surface of a particular member, respectively, so that the conductive metal foil contacts the surface of the particular member, the particular member being at least one of the rotary member, the friction member, the stationary member and the displacement member, wherein
    the at least two self-discharge type static charge eliminators are air-ion-exchange type self-discharge static charge eliminators, the air-ion-exchange type self-discharge static charge eliminators being configured to change air around the self-discharge type static charge eliminator into negative air ions, according to a quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant,
    wherein the rotary member, the friction member, the pressing device, the stationary member and the displacement member are each made of a metal material, wherein
    the rotary member is a brake disc that rotates about the rotational axis;

the friction member is a brake pad;
the pressing device is an opposed-piston type pressing device;
the stationary member is a caliper;
the displacement member includes at least two pistons, the pistons being disposed on opposite sides of the brake disc and being operable to slide relative to the caliper along an axis parallel to the rotational axis;
the pistons are operable to press the brake pad against the brake disc; and
the particular member is at least one of the brake disc, the brake pad and the caliper,
wherein
the electrically conductive metal foil has a multiplicity of protrusions and recesses at a side surface of an outer periphery, and a layer of an adhesive applied to one surface of the metal foil; and
the self-discharge type static charge eliminator is fixed to the particular member by bonding using the layer of the adhesive.

3. A braking force generation device for a vehicle, the braking force generation device comprising:
a rotary member rotating about a rotational axis along with a wheel;
a friction member being supported so as not to rotate about the rotational axis;
a pressing device including a stationary member and a displacement member, the stationary member, having sliding portions, being supported by a knuckle, the displacement member being operable to slide relative to the stationary member, support the friction member and press the friction member against the rotary member, sliding portions of the stationary member and the displacement member being lubricated by a lubricant; and
at least two self-discharge type static charge eliminators including a conductive metal foil directly fixed on a surface of a particular member, respectively, so that the conductive metal foil contacts the surface of the particular member, the particular member being at least one of the rotary member, the friction member, the stationary member and the displacement member, wherein
the at least two self-discharge type static charge eliminators are air-ion-exchange type self-discharge static charge eliminators, the air-ion-exchange type self-discharge static charge eliminators being configured to change air around the self-discharge type static charge eliminator into negative air ions, according to a quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant, wherein the rotary member, the friction member, the pressing device, the stationary member and the displacement member are each made of a metal material,
wherein
the rotary member is a brake drum that rotates about the rotational axis;
the friction member is a brake shoe; and
the stationary member is configured to support the brake shoe such that the brake shoe can be displaced relative to the stationary member, and fixedly support the pressing device, the particular member being at least one of the brake drum, the brake shoe, and the stationary member,
wherein
the electrically conductive metal foil has a multiplicity of protrusions and recesses at a side surface of an outer periphery, and a layer of an adhesive applied to one surface of the metal foil; and
the self-discharge type static charge eliminator is fixed to the particular member by bonding using the layer of the adhesive.

4. A braking force generation device for a vehicle, the braking force generation device comprising:
at least two self-discharge type static charge eliminators including a conductive metal foil directly fixed on a surface of a particular member of the braking force generation device, so that the conductive metal foil contacts the surface of the particular member, the particular member being at least one of a rotary member, a friction member, a stationary member and a displacement member made of metal material, wherein
the at least two self-discharge type static charge eliminators are air-ion-exchange type self-discharge static charge eliminators, the air-ion-exchange type self-discharge static charge eliminators being configured to change air around the self-discharge type static charge eliminator into negative air ions, according to a quantity of positive charge carried by the particular member, and eliminate charge by causing the negative air ions to attract the positive charges of the particular member for neutralization, so as to reduce a quantity of charge of the particular member, and thereby reduce a quantity of charge of the lubricant,
wherein
the electrically conductive metal foil has a multiplicity of protrusions and recesses at a side surface of an outer periphery, and a layer of an adhesive applied to one surface of the metal foil; and
the self-discharge type static charge eliminator is fixed to the particular member by bonding using the layer of the adhesive.

* * * * *